United States Patent [19]
Uchida et al.

[11] Patent Number: 4,658,233
[45] Date of Patent: Apr. 14, 1987

[54] STRAIN GAUGE

[75] Inventors: Yoshiyuki Uchida; Masaharu Nishiura, both of Kanagawa, Japan

[73] Assignee: Fuji Electric Corporate Research & Development Ltd., Yokosuka, Japan

[21] Appl. No.: 712,609

[22] Filed: Mar. 18, 1985

[30] Foreign Application Priority Data

Mar. 16, 1984 [JP] Japan ................................. 59-51841
Mar. 16, 1984 [JP] Japan ................................. 59-51842

[51] Int. Cl.$^4$ ............................................. G01L 1/22
[52] U.S. Cl. .......................................... 338/5; 338/2; 73/726
[58] Field of Search .................... 338/2, 4, 5, 3; 357/2, 357/26; 73/720, 721, 726, 727

[56] References Cited

U.S. PATENT DOCUMENTS 4,411,158  10/1983  Schaff, Jr. ........................... 338/4 X
4,422,063  12/1983  Pryor .................................... 338/2

Primary Examiner—E. A. Goldberg
Assistant Examiner—M. M. Lateef
Attorney, Agent, or Firm—Finnegan, Henderson, Farabow, Garrett & Dunner

[57] ABSTRACT

A strain gauge includes a flexible substrate and film of microfine grains of amorphous silicon connected between electrodes. A strain gauge assembly comprises a substrate, a first electrode formed on the substrate, a semiconductor body connected at a first end to the first wire and including a plurality of layers of different semiconductor materials forming a blocking diode and a resistance, and a second electrode connected to a second end of the semiconductor body such that the diode and resistance are between the first and second electrodes.

14 Claims, 19 Drawing Figures

STRAIN GAUGE

FIELD OF THE INVENTION

The present invention relates to a strain gauge that measures an amount of strain in terms of a change in electrical resistance and to a strain distribution sensor that scans the changes in the resistances of an array of strain gauges formed in a plane.

BACKGROUND OF THE INVENTION

Two principal types of strain gauges have been known. One type is referred to as a wire type gauge and comprises a serpentine pattern of electrically resistive wire, e.g., nichrome wire with a diameter of about 10 μm, bonded to a sheet of paper or felt, the second type of strain gauge, the foil type gauge, comprises a foil of Cu-Ni alloy bonded to a polymer film made of polyimide, polyester, or phenolic resin. This foil normally has a thickness of a few micrometers and is etched with a sinuous pattern on a width of several tens of micrometers. The foil type gauges usually conduct a larger current flow than the wire type gauges.

These types of conventional strain gauges have a gauge factor range of 2 to 3 and must be formed in complex patterns in order to have high sensitivity. The formation of the complex patterns causes each type of strain gauges to be relatively expensive.

The reliability of these types of conventional strain gauges has been low because of problems in bonding thin wires or foils to the substrate with an adhesive.

A third type of strain gauge using a semiconductor device instead of metal wires and foils is also available. Typically, semiconductor strain gauges feature a gauge factor that is 10 to 50 times higher than metallic strain gauges. The brittleness of the semiconductor gauges and difficulty in effecting consistently acceptable bonds with thin semiconductor devices have plagued this type of strain gauge. Also, since changes in the resistance of a strain gauge varies with changes in the angle between the gauge length and the direction of the strain, many gauges must be arranged in predetermined directions in order to measure strain distribution on a large area. This has been difficult to accomplish with conventional semiconductor strain gauges.

Also, it is common to require information concerning the distribution of mechanical forces over a surface. As an example, robot "hands" must be capable of handling various types of objects with forces that are suited to the objects being handled. This requires determining the planar distribution of gripping forces by the robot hands.

A conventional mechanism for measuring the planar distribution is schematically shown in FIG. 1. Perpendicular conductor wires 1', 2' are insulated from each other and are arranged in a lattice form. A plurality of strain gauges 3' are provided in a matrix such that one end of each strain gauge is in contact with one of the wire 1' and the other end of the strain gauge 3' is connected to a wire 2'. A voltage is selectively applied to a pair of terminals 4', 5' connected to the wires 1', 2', respectively, to scan the matrix of strain gauges 3' to determine the distribution of strain in a plane by measuring the changes in the resistances of the gauges in terms of the current flowing through each gauge. For example, the resistance of the gauge 31' can be measured by applying a voltage between the terminals 41' and 51'.

In order to obtain accurate measurements, each strain gauge 3 must be provided with a series-connected blocking diode to limit current flowing into the gauge of interest from other gauges. The resistance of each strain gauge 3 is dependent on the angle that the gauge length forms with respect to the direction of the strain. Therefore, to determine the distribution of strain accurately, the strain gauges 3 must be arranged in predetermined directions and as many strain gauges 3 as possible should be used to obtain precise measurements of strain distribution. It is, however, very difficult to bond a large number of strain gauges in exactly the same direction. Considerable difficulty is also involved in connecting a blocking diode to each strain gauge without causing undesired changes in the measurements of strain distribution.

OBJECTS AND SUMMARY OF THE INVENTION

An object of the present invention is a low cost yet highly reliable strain gauge.

Another object of the present invention is a semiconductor strain gauge that can be reproduced in large quantities with similar characteristics.

A further object of the present invention is a strain gauge with a high gauge factor.

Yet another object of the present invention is a strain gauge assembly for accurately measuring strain distribution over a large area.

Still another object of the present invention is a strain gauge assembly that readily permits the fabrication of a matrix of strain gauges arranged in predetermined directions.

These and other objects are accomplished by a strain gauge comprising an amorphous semiconductor film formed on a flexible substrate.

As another fundamental aspect of the present invention, a strain gauge assembly comprises a substrate, a first wire formed on the substrate, a semiconductor body formed on the substrate and having a first end connected to the first wire and a second end, the semiconductor body including a plurality of layers of different semiconductor materials forming a p-n junction, and a second wire formed on the substrate and insulated from the first wire, the second wire being connected to the second end of the semiconductor body.

BRIEF DESCRIPTION OF THE DRAWINGS

The manner in which the above and other objects, features, and advantages are accomplished by the present invention will become more apparent when the following detailed description is considered in view of the drawings, wherein.

DETAILED DESCRIPTION OF THE PREFERRED EMBODIMENTS

Figure 1:
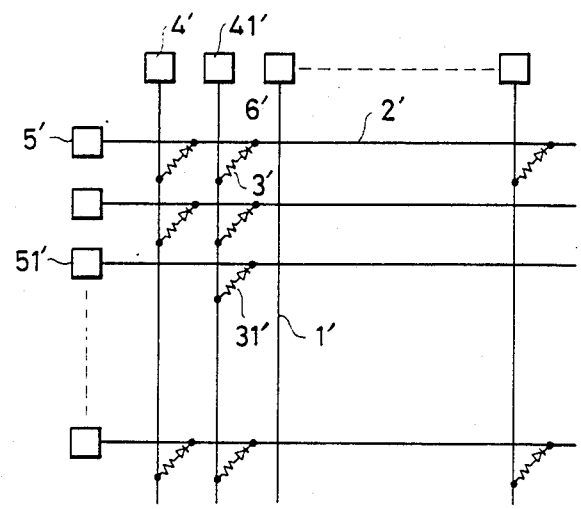
FIG. 1 is a schematic view of a conventional strain gauge assembly.
Figure 2A:
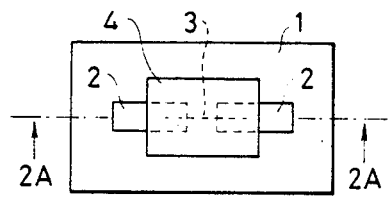
FIG. 2(a) is a plane view of the strain gauge of the present invention.
Figure 2B:
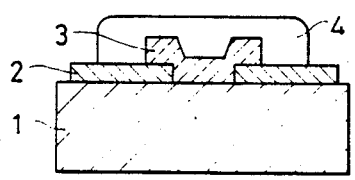
FIG. 2(b) is a cross-sectional view of the strain gauge of FIG. 2(a) taken along the line 2A—2A.

FIGS. 2(a) and 2(b) show one embodiment of the strain gauge of the present invention. A substrate 1 of a thickness of 40–120 μm is made of a polymer film such as polyimide. A pair of metal electrodes 2, which can be made of Ni, Cr, stainless steel, Ti, or a lamination of Ni-Cr, Ni-Cr-Au, Ti-Al-Cu or Ti-Al-Ni, are formed on the substrate 1 either by evaporation with an electron beam or by sputtering. The electrodes 2 are spaced at an interval of, for example, 1 mm. The desired electrode pattern can be formed either by placing a metal mask on the polymer film 1 during evaporation or sputtering or by first depositing the metal layer over the entire surface of the substrate and then removing the unwanted area by photo-etching.

Subsequently, a-Si (amorphous silicon) layer 3 is formed by glow-discharge decomposition in a wire-like configuration measuring, for example, 0.1 mm×1.0 mm. The a-Si layer may be formed by a known technique wherein a silane gas diluted 10–30 fold with hydrogen is decomposed by a glow-discharge in a vacuum of 1–10 Torr under an RF electric field. In order to produce a p-type a-Si layer, a silane gas is mixed with a diborane gas. A phosphine gas is used if an n-type a-Si layer is desired. The substrate is preferably held at a temperature between 150° and 300° C.

As the RF power is increased, grains in the size range of 50°–200 Å grow to provide an a-Si layer comprised of microfine grains. An a-Si layer of either p-type or n-type commonly has a resitivity of $10^{-4}$ to $10^{-3}$ $\Omega cm^{-1}$ if it is not comprised of microfine grains. An a-Si layer comprised of microfine grains, however, has an increased resistivity of 1–10 $\Omega cm^{-1}$. This means an a-Si film comprised of microfine grains provides a 500 kΩ resistor if its thickness is 2,000 Å.

If the silane gas (SiH$_4$) is replaced by SiF$_4$ gas, the latter may be diluted about 10-fold with hydrogen so as to produce an a-Si layer of high resistivity. This a-Si layer is also comprised of microfine grains.

The a-Si layer 3 may be covered with an opaque protective layer 4 that is formed in a thickness of about 10 μm by patterning, typically printing, an epoxy or phenolic paint.

Figure 3:
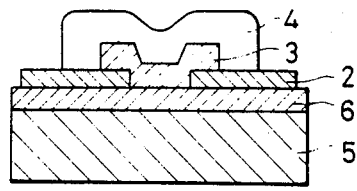
FIG. 3 is a cross-sectional view of another embodiment of the strain gauge of the present invention.

FIG. 3 shows another embodiment of the strain gauge of the present invention. In this embodiment, a substrate is formed of a thin metal plate 5, such as one made of stainless steel, which is coated with an insulating resin layer 6 typically made of polyimide.

The strain gauges shown in FIGS. 2(b) and 3 may be put into service after bonding the substrate 1 or 5 to the object of interest with an adhesive.

Figure 4A:
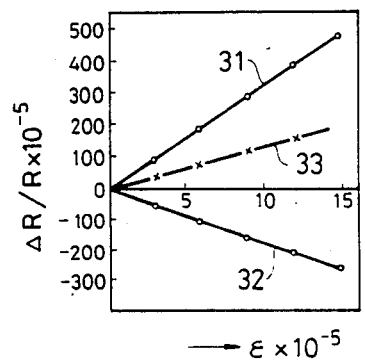
FIGS. 4(a), 4(b) and 4(c) are graphical illustrations of characteristics of the strain gauges of the present invention.
Figure 4B:
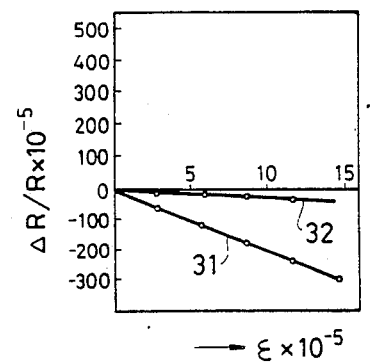
Figure 4C:
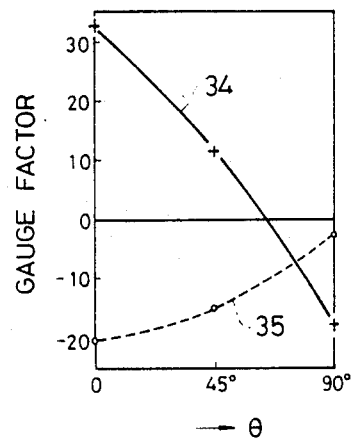

The characteristics of the thin-film type strain gauges shown in FIGS. 2(b) and 3 are depicted in FIGS. 4(a) to 4(c). FIGS. 4(a) and 4(b) show the relationship between the strain ε and the resistance change ΔR/R. FIG. 4(a) refers to a p-type a-Si film and FIG. 4(b) to an n-type a-Si film. In either case, the resistance change ΔR/R varies in proportion to the strain ε, but the proportionality constant indicating the gauge factor assumes different values depending upon the angle θ that the gauge length forms with respect to the direction of the strain. The line 31 referes to θ=0° wherein the gauge is aligned in the direction of the strain. The line 32 refers to θ=90° wherein the gauge is positioned at a right angle with respect to the strain. Finally, the line 33 refers to θ=45°. FIG. 4(c) illustrates the dependency of the gauge factor on the angle θ. The line 34 refers to a p-type a-Si layer and the line 35 to an n-type a-Si layer.

Figure 5:
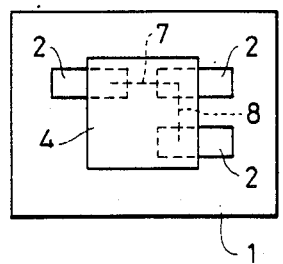
FIG. 5 is a plan view of a third embodiment of the strain gauge of the present invention.

FIG. 5 is a plan view showing another embodiment of the strain gauge of the present invention. In this embodiment, three units of metal electrode 2 are formed on the polymer substrate 1 on which are disposed two p-type a-Si layers 7 and 8 comprising microfine grains. The layers 7 and 8 form a right angle with respect to each other and have the same width and length. These a-Si layers 7, 8 are covered with a protective layer 4 which is also opaque to light.

If the a-Si layer 7 has a resistance R$_7$ and the a-Si layer 8 has a resistance R$_8$, if strain ε that the gauge is subjected to form an angle θ with respect to the length of the a-Si layer 7, R$_7$ and R$_8$ can be expressed as follows:

$$R_7 = R_{70} \cdot k(T)[1 + \alpha(\theta)\epsilon]$$

$$R_8 = R_{80} \cdot k(T)[1 + \alpha(90° - \theta)\epsilon]$$

wherein R$_{70}$ and R$_{80}$ are the resistances of a-Si layers 7 and 8, respectively, under no strain at the reference temperature, and k(T) is a coefficient representing the temperature characteristics of these resistances. The differential ratio of R$_7$ to R$_8$ is written by:

$$\frac{\Delta R_7}{\Delta R_8} = \frac{R_{70}}{R_{80}}[1 + \{\alpha(\theta) - \alpha(90° - \theta)\}\epsilon]$$

wherein $\Delta R_7 = R_{70} \cdot k(T) \alpha(\theta)\epsilon$ and $\Delta R_8 = R_{80} \cdot k(T) \alpha(90° - \theta)\epsilon$. The value of ΔR$_7$/ΔR$_8$ is independent of temperature since the value of R$_{70}$/R$_{80}$ is temperature-independent and is not subject to temperature-induced errors if the values of R$_{70}$ and R$_{80}$ are measured at the reference temperature in the absence of strain. If the resistive areas in the strain gauge have substantially the same size and shape, R$_{70}$/R$_{80}$ becomes approximately 1.

Figure 6:
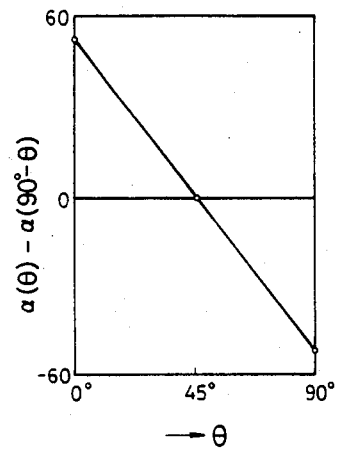
FIG. 6 is a graphical illustration of the angular dependency of the strain gauge of FIG. 5.

FIG. 6 shows the dependency of $\alpha(\theta) - \alpha(90° - \theta)$ on the angle θ for a p-type a-Si layer in FIG. 5. It can be seen that the strain gauge shown in FIG. 5 has a higher sensitivity (or gauge factor) than the device shown in FIG. 2 or 3. This increased sensitivity of the gauge shown in FIG. 5 enables the detection of not only the amount but also the direction of the strain.

The patterning of the a-Si layers 7 and 8 in FIG. 5 is done by photo-etching, so that the layers can be formed with sufficient accuracy to ensure an improved precision in strain measurement. The a-Si layers 7 and 8 need not be formed at a right angle with respect to each other, but if they are not data analysis and calculation become more complicated.

Figure 7:
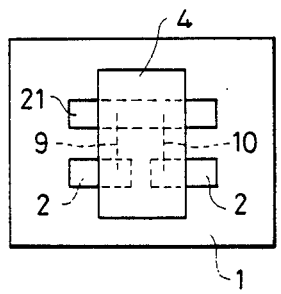
FIG. 7 is a plan view of a fourth embodiment of the strain gauge of the present invention.
Figure 8:
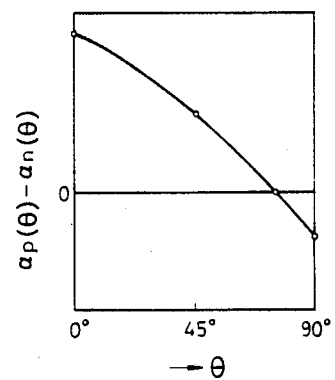
FIG. 8 is a graphical illustration of the angular dependency of the strain gauge of FIG. 7.

FIG. 7 shows another embodiment using two small metal electrodes 2 and one large metal electrode 21, as well as two a-Si layers 9 and 10 which are comprised of microfine grains and are disposed parallel to each other. The layer 9 is p-type and the layer 10 is n-type. If $R_9$ and $R_{10}$ are written for the resistances of the layers 9 and 10, respectively, the following relation is established similar to that obtained for the embodiment in FIG. 5.

$$\frac{\Delta R_9}{\Delta R_{10}} = \frac{R_{90}}{R_{100}} [1 + \{\alpha_p(\theta) - \alpha_n(\theta)\}\epsilon]$$

wherein $R_{90}$ and $R_{100}$ are the resistances of the layers 9 and 10 for a certain temperature in the absence of strain $\epsilon$. By measuring the values of $\Delta R_9$ and $\Delta R_{10}$, the gauge can be used without any dependency on the temperature. FIG. 8 shows the $\alpha_p(\theta) - \alpha_n(\theta)$ versus angle ($\theta$) of the gauge of FIG. 7.

Figure 9:
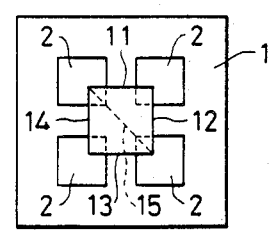
FIG. 9 is a plan view of a fifth embodiment of the strain gauge of the present invention.

FIG. 9 shows another embodiment using four metal electrodes 2 connected by thin a-Si layers 11, 12, 13 and 14 that provide the four sides of a square, and a thin a-Si layer 15 that forms a diagonal for the square. It is not necessary that the layers 11 to 14 form a square, but preferably the layers 11 and 12 should be parallel to the layers 13 and 14, respectively. As in the other embodiments, the a-Si layers are covered with an opaque protective layer (not shown).

Figure 10:
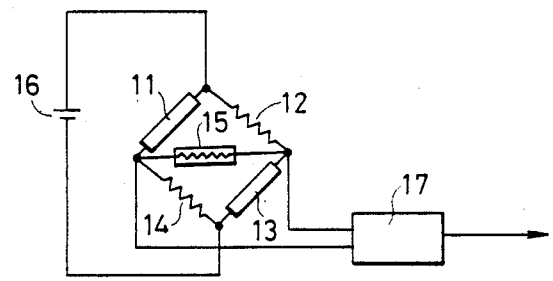
FIG. 10 is a schematic circuit diagram of a strain measuring circuit incorporating the strain gauge of FIG. 9.

FIG. 10 is a circuit diagram illustrating the operation of the strain gauge in FIG. 9. A power source 16 supplies a voltage for producing a current that flows through each of the thin-film resistors. If the thin films 11 to 15 have resistances of $R_1$ to $R_5$ respectively and if the power source 16 produces an output voltage of E, the voltage that develops across the film 15 is written as follows:

$$V = \frac{(-R_2R_4 + R_1R_3) R_5 E}{R_1R_2R_3 + R_1R_2R_4 + R_1R_2R_5 + R_2R_3R_4 + R_2R_3R_5 + R_1R_3R_4 + R_1R_3R_5 + R_3R_4R_5}$$

The resistances $R_1$ to $R_5$ have the same degree of temperature dependency and each of the terms in both the numerator and the denominator is the product of any three resistances out of a total of five. As a consequence, the measured value of V has no error component due to temperature variations. If $R_1$ to $R_4$ have resistances $R_{10}$ to $R_{40}$ at the reference temperature in the absence of strain, and if a set of films 11 and 13 form a right angle with the films 12 and 14, the following relations are obtained:

$$R_1 = R_{10}\{1 + \alpha(\theta)\epsilon\}$$

$$R_3 = R_{30}\{1 + \alpha(\theta)\epsilon\}$$

$$R_2 = R_{20}\{1 + \alpha(90° - \theta)\epsilon\}$$

$$R_4 = R_{40}\{1 + \alpha(90° - \theta)\epsilon\}$$

If the design parameters of the gauge are so selected that $R_1R_3 - R_2R_4 = R_{10}R_{30}\{1 + 2\alpha(\theta)\epsilon\} - R_{20}R_{40}\{1 + 2\alpha(90° - \theta)\epsilon\}$ and $R_{10}R_{30} = R_{20}R_{40}$, the following relation is obtained:

$$R_1R_3 - R_2R_4 = 2R_{10}R_{30}\{\alpha(\theta) - \alpha(90° - \sigma)\}\epsilon.$$

Therefore, the term $(R_1R_3 - R_2R_4)$ in the formula for the voltage V is proportional to the strain $\epsilon$ and precise measurement of the strain in terms of V can be achieved irrespective of possible temperature variations. The variations of $R_1$ to $R_5$ under strain are only a fraction of one percent at maximum, so the error that these variations may cause in the measurement of each of the terms in the denominator and $R_5$ in the numerator is of no consequence. The voltage V is amplified and converted to a strain-indicating value by an amplifier 17.

Since the thin-film resistors 11 and 12 are parallel to the resistors 13 and 14, respectively, the resistors 11 and 13 and the resistors 12 and 14 experience the same resistance change with respect to a given strain. Therefore, the voltage V indicates the strain as amplified by the differential resistance change and provides a convenient tool for measuring a small strain with high accuracy. All of the thin films 11 to 14 may be made of p-type or n-type a-Si. Alternatively, the set of thin films 11 and 13 may be made of a-Si of one conduction type and the thin films 12 and 14 may be of the opposite conduction type.

The strain gauge in accordance with the present invention is produced from a thin amorphous semiconductor film, preferably made of microfine grains, which can be formed on a flexible substrate of a polymer film by vapor-phase growth at low temperatures. This strain gauge provides a gauge factor that is several tens of times as high as that achieved by metallic gauges. Additionally, resistive elements of a desired shape can be readily formed by employing photo-etching techniques. This contributes to a low price but a very high reliability of the final product.

Figure 11:
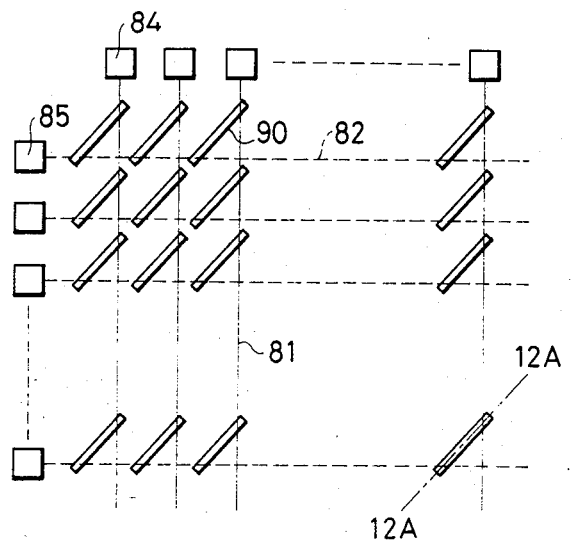
FIG. 11 is a plan view of a strain gauge assembly according to the present invention.

FIG. 11 shows one embodiment of the strain distribution assembly of the present invention. Each of the strain gauges 90 used in this embodiment has a structure of the type shown in FIG. 12 which is a cross section taken on line 12A—12A of FIG. 12. A substrate 87 is made of a flexible polymer film such as polyimide and has a thickness of 40–120 μm.

A plurality of metal conductor wires 82 are formed on the substrate 87 parallel to each other. The metal wires 82 are made of Ni, Cr, stainless steel, Ti or a lamination of Ni-Cr, Ni-Cr-Au, Ti-Al-Cu or Ti-Al-Ni. The wires 82 are formed in a thickness of 1,000–5,000 Å either by evaporation with an electron beam or by sputtering. All of the surface of the substrate 87 except for a part of each conductor wire 82 is covered with an insulator coat 88.

A p-type a-Si layer 91 is subsequently formed in such a manner that it contacts the metal wire 82 at one end. The a-Si layer 91 is formed by the glow-discharge decomposition of silane gas as described above. More specifically, silane gas diluted 10–30 fold with hydrogen gas is mixed with diborane gas and is decomposed in an RF electric field at a pressure of 1–10 Torr. The substrate is held at between 150° and 300° C. until an a-Si layer having a thickness of 2,000 Å forms. As the RF power is increased, grains of a size between 50 and 200Å grow to provide an a-Si layer comprised of microfine grains.

An a-Si layer of either p-type or n-type has a resistivity of $10^{-4}$ to $10^{-3}$ $\Omega cm^{-1}$ if it is not comprised of microfine grains. An a-Si layer comprised of microfine grains, however, has an increased resitivity of 1–10

Ωcm$^{-1}$. Following the a-Si layer 91, an undoped a-Si layer 92 and an n-type a-Si layer 93 are formed in respective thicknesses of 0.5 μm and several hundred angstroms. The assembly of the three a-Si layers may be patterned in a desired configuration by photo-etching. The other end of the body of a-Si layers 90 is brought into contact with a metal conductive wire 81. The insulator coat 88, the body 90 and the conductor wire 81 are all covered with a protective coat (not shown).

The dimensions of the a-Si layer body 90 are the same for all strain gauges. With an a-Si layer body 90 that is 0.1 mm wide and 1 mm long, the resistance between the two conductor wires 81 and 82 is about 500 kΩ which is the same as the value exhibited by the a-Si layer 91 in the absence of the undoped a-Si layer 92 and the n-type layer 93.

Figure 12:
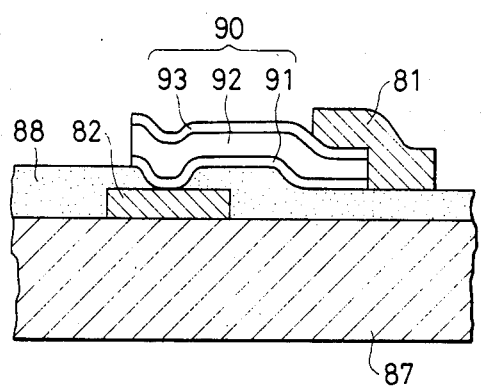
FIG. 12 is a cross-sectional view of the strain gauge assembly of FIG. 11 taken along the line 12A—12A.

In the construction shown in FIG. 12, a strain gauge resistor made of the p-type a-Si layer 91 is seriesconnected to a blocking diode having a p-i-n junction composed of the p-type layer 91, the undoped layer 92 and n-type layer 93. A plurality of the combinations of gauge resistors and blocking diodes may be arranged in a matrix form as illustrated in FIG. 11, and the individual sets of gauge resistors and blocking diodes may be scanned with voltages applied from electrodes 84 and 85 to determine the distribution of strains in a plane.

Figure 13:
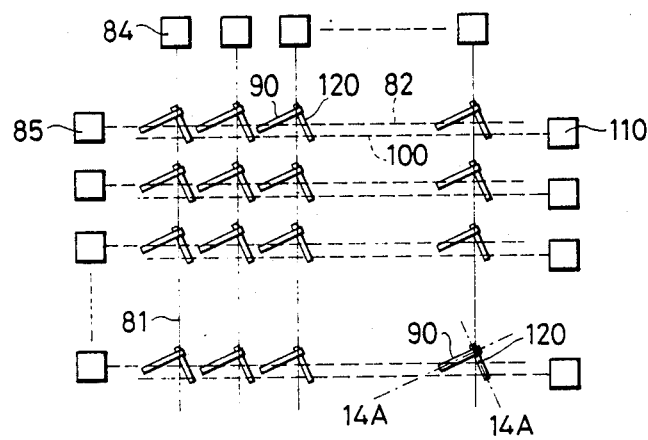
FIG. 13 is a plan veiw of another embodiment of the strain gauge assembly of the present invention.

FIG. 13 shows another embodiment of the present invention wherein two strain gauges are connected at a right angle with respect to each other and a plurality of such pairs are arranged in a matrix form. In this embodiment, a plurality of conductor wires 100, each having a terminal 110, are provided in parallel to the conductor wires 82. A strain gauge 120 is positioned at a right angle with respect to a strain gauge 90 that is connected between the conductor wires 81 and 82 which are both made of an a-Si layer.

Figure 14:
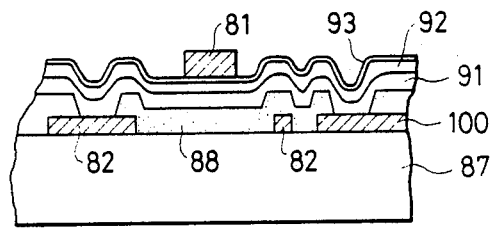
FIG. 14 is a cross-sectional view of the strain gauge assembly of FIG. 13 taken along the line 14A—14A.
Figure 15:
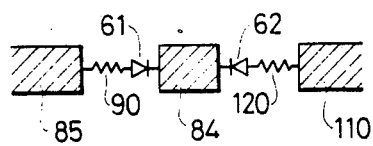
FIG. 15 is a schematic diagram of the equivalent circuit to the strain gauge assembly illustrated in FIG. 14.
Figure 16:
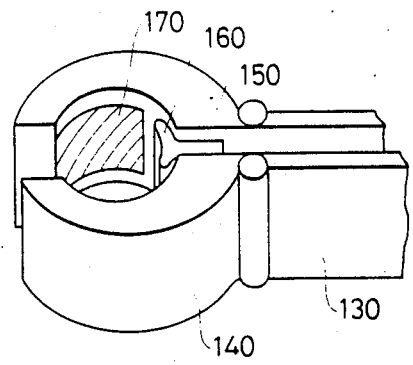
FIG. 16 is a perspective view showing the strain gauge assembly of the present invention used in the hand of a robot.

FIG. 14 is a cross section taken on line 14A—14A of FIG. 13. The conductor wires 82 and 100 are formed on the substrate 87, and after forming the insulator coat 88, a p-type a-Si layer 91, an undoped a-Si layer 92 and an n-type a-Si layer 93 are successively formed. FIG. 15 is the equivalent circuit of FIG. 14 and, as shown, the measurement of strain distribution can be made, with the strain gauges 90 and 120 being isolated by a pair of blocking diodes 61 and 62 each of which is made of a p-i-n junction. The embodiment shown in FIG. 14 also enables the direction of the strain to be detected in terms of the ratio of the resistance of the strain gauges 90 to that of the gauge 120.

FIG. 6 shows the use of the strain distribution assembly of the present invention in a robot hand which is connected to an arm 130 and comprises a pair of pincers 140 and 150. The arm 130 supports the pincers 140, 150 and has a drive unit for opening or closing them. A cushion 160 is provided between the pincers 140, 150.

A distribution sensor 170 is attached to the inside, outside or any other appropriate portion of the pincers 140, 150. When the robot hand lifts an object, for example, a cup, a counterforce develops and causes a strain in the pincers 140 and 150. The amount of this strain is read by the sensor 170 and a force within the allowed range is applied to the cup so that it can be lifted without breaking. The force being applied to the cup can be correctly estimated by measuring the strain distribution in the plane of the robot hand, rather than at a single point in the hand.

The strain gauge assembly of the present invention includes strain gauges formed of a lamination of thin semiconductor films having a p-n junction, which also provides a blocking diode series connected for each gauge. The assembly comprising the strain gauges and blocking diodes enables the measurement of strain distribution within a plane by scanning the changes in the resistances of the gauges. Since the thin semiconductor film can be patterned in a desired shape, a plurality of strain gauges arranged in predetermined directions can be readily fabricated. This feature, coupled with the ease of connection to conductor wires, enables the production of the assembly at low cost. By making use of this assembly, a matrix of strain gauges arranged in the same direction can be attached to appropriate areas of desired dimensions.

What is claimed is:
1. A strain gauge comprising:
 a substrate;
 an amorphous semiconductor film formed on said substrate, said amorphous semiconductor film comprising microfine grains and having a resistivity in a range of 1 to 10 ohms/cm;
 an electrode pair coupled to said amorphous semiconductor film to sense changes in the resistance of said film responsive to strain applied to said film and to determine the amount and direction of the strain.

2. A strain gauge according to claim 1, wherein said semiconductor film comprises amorphous silicon formed by glow discharge.

3. A strain gauge according to claim 1, wherein said semiconductor film includes a p-type semiconductor film formed on said substrate and an n-type semiconductor film formed on said substrate in parallel to said p-type semiconductor film.

4. A strain gauge comprising:
 a substrate;
 first, second and third electrodes formed on said substrate;
 a first semiconductor film formed on said substrate to connect said first and second electrodes; and
 a second semiconductor film formed on said substrate to connect said second and third electrodes,
 said first and second semiconductor films comprising amorphous silicon having microfine grains and a resistivity in a range of 1 to 10 ohms/cm,
 wherein said electrodes are used to determine amount and direction of strain exerted on said semiconductor films.

5. A strain gauge according to claim 4, wherein said first semiconductor film is perpendicular to said second semiconductor film.

6. A strain gauge according to claim 5, wherein said first and second semiconductor film are of the same conductivity type.

7. A strain gauge according to claim 4, wherein said first semiconductor film is parallel to said second semiconductor film.

8. A strain gauge according to claim 7, wherein said first and second semiconductor films are of opposite conductivity types.

9. A strain gauge comprising:
 a substrate;
 first, second, third and fourth electrodes formed on said substrate;
 a first semiconductor film formed on said substrate to connect said first and second electrodes;
 a second semiconductor film formed on said substrate to connect said second and third electrodes;

a third semiconductor film formed on said substrate to connect said third and fourth electrodes; and a fourth semiconductor film formed on said substrate to connect said first and fourth electrodes, said first, second, third and fourth semiconductor films comprising amorphous silicon material having microfine grains and a resistivity in a range of 1 to 10 ohms/cm, wherein said electrodes are used to determine amount and direction of strain exerted on said semiconductor films.

10. A strain gauge according to claim 9, wherein said first and third semiconductor films are formed in parallel and said second and fourth semiconductor films are formed in parallel.

11. A strain gauge according to claim 10, wherein said first and third semiconductor films are perpendicular to said second and fourth semiconductor films.

12. A strain gauge according to claim 11, further including a fifth semiconductor film formed on said substrate to connect said first and third electrodes.

13. A strain gauge assembly comprising:

a substrate;

a first wire formed on said substrate;

a semiconductor body formed on said substrate having a first end connected to said first wire and a second end, said semiconductor body including a plurality of layers of different semiconductor materials forming a p-n junction, each of said semiconductor materials being amorphous silicon comprising microfine grains and having a resistivity in a range of 1 to 10 ohms/cm; and a second wire formed on said substrate and insulated from said first wire, said second wire being connected to said second end of said semiconductor body, wherein said first and second wires are used to determine amount and direction of strain exerted on said semiconductor body.

14. A strain gauge according to claim 13, wherein said layers of semiconductor material comprising said semiconductor body form a blocking diode and a resistance between said first wire and said second wire.

* * * * *